United States Patent
Kato

(10) Patent No.: US 7,649,053 B2
(45) Date of Patent: Jan. 19, 2010

(54) TONER BINDER FOR ELECTROPHOTOGRAPHY AND TONER

(75) Inventor: Tomohisa Kato, Kyoto (JP)

(73) Assignee: Sanyo Chemical Industries, Ltd, Kyoto (JP)

( * ) Notice: Subject to any disclaimer, the term of this patent is extended or adjusted under 35 U.S.C. 154(b) by 676 days.

(21) Appl. No.: 10/505,918

(22) PCT Filed: Feb. 25, 2003

(86) PCT No.: PCT/JP03/02038

§ 371 (c)(1), (2), (4) Date: Jun. 21, 2005

(87) PCT Pub. No.: WO03/073170

PCT Pub. Date: Sep. 4, 2003

(65) Prior Publication Data

US 2005/0238985 A1 Oct. 27, 2005

(30) Foreign Application Priority Data

Feb. 26, 2002  (JP) .............................. 2002-049530

(51) Int. Cl.
  *G03G 9/087* (2006.01)
  *G03G 9/08* (2006.01)
  *C08L 25/04* (2006.01)
  *C08F 257/02* (2006.01)

(52) U.S. Cl. .................... 525/241; 525/221; 525/222; 525/227; 525/301; 525/302; 525/299; 525/333.3; 430/109.3; 430/111.1

(58) Field of Classification Search .............. 430/109.3, 430/111.4; 525/241, 221, 222, 227, 299, 525/301, 302, 333.3
See application file for complete search history.

(56) References Cited

U.S. PATENT DOCUMENTS

| | | | | |
|---|---|---|---|---|
| 5,476,741 A * | 12/1995 | Nishikiori et al. | ......... | 430/108.8 |
| 5,567,563 A * | 10/1996 | Minami | .................... | 430/108.4 |
| 5,684,090 A * | 11/1997 | Chupka, Jr. | ................. | 525/285 |
| 5,962,176 A * | 10/1999 | Ohno et al. | .............. | 430/108.4 |
| 6,255,028 B1 * | 7/2001 | Hasegawa et al. | ........ | 430/109.3 |

FOREIGN PATENT DOCUMENTS

| | | |
|---|---|---|
| EP | 0 438 181 | 7/1991 |
| EP | 575891 A2 * | 6/1993 |
| EP | 0 575 891 | 12/1993 |
| EP | 0 827 037 A1 | 3/1998 |
| JP | 10-010782 | 1/1998 |
| JP | 2000-284539 | 10/2000 |
| JP | 2001-330991 | 11/2001 |
| JP | 2002-030192 | 1/2002 |
| JP | 2002-131974 | 5/2002 |

OTHER PUBLICATIONS http://openlearn.open.ac.uk/mod/resource/view.php?id=196637, 2009, Introduction to Polymers, chapter 2.5.*

* cited by examiner

*Primary Examiner*—Roberto Rábago
(74) *Attorney, Agent, or Firm*—Edwards Angell Palmer & Dodge LLP; Jun Umemuro; Dwight D. Kim

(57) ABSTRACT

A toner binder for electrophotography excellent in low temperature fixing properties and anti-hot offset properties comprising styrene (co)polymer(s) (A) comprising a modified styrene (co)polymer modified by unsaturated dicarboxylic acids of C4 to C30, ester-forming derivatives thereof, (meth) acrylic acid, or alkyl (meth)acrylates (alkyl group of C1 to C24); said modified styrene (co)polymer containing constituent units derived from a monomer used in the modification is 0.1 to 9 wt %, and a toner using the toner binder. The (co)polymer(s) (A) includes a species that shows at least one GPC peak each in the regions of the molecular weight of 2,000 to 20,000 and 50,000 to 5 million.

8 Claims, No Drawings

TONER BINDER FOR ELECTROPHOTOGRAPHY AND TONER

TECHNICAL FIELD

The present invention relates to a toner used in electrophotography, electrostatic recording, electrostatic printing, and the like, and to a toner binder for electrophotography used therein.

BACKGROUND ART

Methods have widely been adopted that use a heated roller in order to fix a toner-visualized electrostatic latent image in electrophotography.

For the use of this method, it is desired that the lowest fixing temperature (Tf: the lowest temperature of a heated roller at which a fixing level of 70% is obtained) of a toner is low, and that the hot offset temperature (Th: the lowest temperature of a heated roller at which the hot offset occurs) is high. To meet these two needs, the molecular weight distribution of a toner binder has been frequently proposed to be made to widely range from low molecular weights to high molecular weights (e.g. U.S. Pat. Nos. 4,386,147 and 4,486,524).

However, attempts to render the molecular weights of the low molecular weight region to make lower and to increase the low molecular weight ratio for the purpose of lowering the lower limit of the fixing temperature poses the problem of the image deterioration being likely to occur during running of the toner.

DISCLOSURE OF THE INVENTION

The present inventor has earnestly studied toner binders resulting in toners without the above-described problem to reach the present invention.

In other words, the present invention comprises three inventions below.

[First Invention]

A toner binder for electrophotography comprising styrene (co)polymer(s) (A), at least a part of said styrene (co)polymer(s) (A) being a modified styrene (co)polymer (A1) below:

said modified styrene (co)polymer (A1): A polymer obtainable by modifying a styrene (co)polymer (A0) with at least one monomer (a') selected from the group consisting of unsaturated dicarboxylic acids containing 4 to 30 carbon atoms, ester-forming derivatives thereof, (meth)acrylic acid, and alkyl (meth)acrylates (a carbon number of alkyl group of 1 to 24); said modified-(co)polymer containing constituent units derived from the monomer (a') used in the modification in an amount of 0.1 to 9% by weight.

[Second Invention]

A toner binder for electrophotography that comprises styrene (co)polymer(s) which, in a chromatogram of gel permeation chromatography, exhibits at least one peak each in the region of the molecular weight of 2,000 to 20,000 and in the region of the molecular weight of 50,000 to 5,000,000, with the largest peak in each region corresponding to the largest peak and the second largest peak in the entire chromatogram, and which has the content of styrene therein as the constituent unit of 50% by weight or more, wherein the total content of monomer, dimer and trimer of styrene therein is 1% by weight or less.

[Third Invention]

A toner comprising a coloring agent, and the toner binder for electrophotography of the first or second invention.

BEST MODE FOR CARRYING OUT THE INVENTION

Monomers constituting a styrene (co)polymer (A) in the present invention comprises an essential constituent of styrene, and an optional constituent of other vinyl monomers. Here, a (co)polymer stands for a homopolymer (styrene polymer), or copolymer (copolymer of styrene and other vinyl monomers).

The other vinyl monomers include, for example, the monomers of (a) to (f) below and combinations thereof.

(a) Vinyl monomers containing a carboxyl group:
(a-1) Unsaturated monocarboxylic acids containing 3 to 20 carbon atoms: for example, (meth)acrylic acid, crotonic acid, cinnamic acid, and the like, wherein (meth) acrylic acid means acrylic acid and/or methacrylic acid, and hereinafter it is noted in the same way.
(a-2) Unsaturated dicarboxylic acids containing 4 to 30 carbon atoms and ester forming derivatives thereof [acid anhydride and mono- or dialkyl (alkyl having a carbon number of 1 to 18) esters]: for example, maleic acid, fumaric acid, itaconic acid, citraconic acid, and anhydrides thereof, and mono- or dialkyl (alkyl having a carbon number of 1 to 18) esters thereof (methyl esters, ethyl esters, and the like), and the like;
(a-3) Alkyl (having a carbon number of 1 to 24) unsaturated carboxylates containing 3 to 30 carbon atoms: for example, methyl (meth)acrylate, ethyl (meth)acrylate, propyl (meth)acrylate, butyl (meth)acrylate, 2-ethylhexyl (meth)acrylate, dodecyl (meth)acrylate, stearyl (meth)acrylate, hexadecyl (meth)acrylate, heptadecyl (meth)acrylate, eicosyl (meth)acrylate, cyclohexyl (meth)acrylate, benzyl (meth)acrylate, phenyl (meth) acrylate, ethyl-α-ethoxy(meth)acrylate, and the like;
(a-4) Polyhydric alcohol (2 to 3 or more hydric) unsaturated carboxylate containing 3 to 30 carbon atoms: for example, ethylene glycol di(meth)acrylate, propylene glycol di(meth)acrylate, neopentyl glycol di(meth)acrylate, trimethylolpropane tri(meth)acrylate, 1,6-hexanediol diacrylate, polyethylene glycol di(meth)acrylate, and the like;
(a-5) Esters of unsaturated alcohols (vinyl, isopropenyl, and the like) and mono or polycarboxylic acid containing 1 to 12 carbon atoms: for example, vinyl acetate, vinyl butylate, vinyl propionate, vinyl butyrate, diallyl phthalate, diallyl adipate, isopropenyl acetate, methyl-4-vinyl benzoate, vinylmethoxy acetate, vinyl benzoate, and the like.

(b) Vinyl monomers containing a hydroxyl group:
(b-1) Hydroxyalkyl(meth)acrylates containing 5 to 16 carbon atoms, for example, hydroxyethyl (meth)acrylate and hydroxypropyl (meth)acrylate;
(b-2) Alkenol containing 2 to 12 carbon atoms, for example, (meth)allyl alcohol, 1-butene-3-ol and 2-butene-1-ol;
(b-3) Alkenediol containing 4 to 12 carbon atoms, for example, 2-butene-1,4-diol;
(b-4) Alkenyl ether containing 3 to 30 carbon atoms, for example, 2-hydroxyethylpropenyl ether, saccharose allyl ether, and the like.

(c) Vinyl hydrocarbons:
(c-1) Aromatic vinyl hydrocarbon (a carbon number of 8 to 20) exclusive of styrene: for example, hydrocarbyl (alkyl, cycloalkyl, aralkyl and/or alkenyl) substitution products of styrene, e.g., α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene and trivinylbenzene; and vinylnaphthalene;

(c-2) Aliphatic vinyl hydrocarbon: for example, alkenes containing 2 to 20 carbon atoms, e.g. ethylene, propylene, butene, isobutylene, pentene, heptene, diisobutylene, octene, dodecene, octadecene, α-olefin except the above, and the like; alkadienes containing 4 to 20 carbon atoms, e.g., butadiene, isoprene, 1,4-pentadiene, 1,5-hexadiene and 1,7-octadiene;

(c-3) Alicyclic vinyl hydrocarbon: for example, mono- and dicycloalkene and alkadienes, e.g., cyclohexene, (di) cyclopentadiene, vinylcyclohexene and ethylidene bicycloheptene; terpenes, e.g., pinene, limonene, and indene.

(d) Vinyl monomers containing an epoxy group: for example, glycidyl (meth)acrylate, and the like.

(e) Vinyl monomers containing a nitrile group: for example, (meth)acrylonitrile, and the like.

(f) Vinyl monomers containing an amino group: aminoethyl (meth)acrylate, dimethylaminoethyl (meth)acrylate, diethylaminoethyl (meth)acrylate, t-butylaminoethyl (meth) acrylate, N-aminoethyl (meth)acrylamide, (meth)allylamine, morpholinoethyl (meth)acrylate, 4-vinylpyridine, 2-vinylpyridine, crotylamine, methylα-acetoaminoacrylate, vinylimidazole, N-vinylpyrrole, N-vinylthiopyrrolidone, and the like.

Of these, preferred are a vinyl monomer containing a carboxyl group (a), a vinyl monomer containing a hydroxyl group (b) and an aromatic vinyl hydrocarbon exclusive of styrene (c-1) and a combinations thereof, and more of these, preferred are an alkyl unsaturated carboxylate containing 3 to 30 carbon atoms (a-3), a hydroxyalkyl (meth)acrylate containing 5 to 16 carbon atoms (b-1), an aromatic vinyl hydrocarbon exclusive of styrene (c-1), combinations thereof, and in particular, methyl (meth)acrylate, ethyl (meth)acrylate, butyl (meth)acrylate, 2-ethylhexyl (meth)acrylate, hydroxyethyl (meth)acrylate, and combinations thereof.

The content of styrene as a constituent unit in styrene (co)polymer (A), in terms of fixation properties, storage stability and electrostatic chargeability of a toner, is normally from 50 to 100%, preferably from 70 to 100%, particularly preferably the lower limit of 75% and the upper limit of 99%.

In the above and below, % is by % by weight unless otherwise indicated.

Unmodified styrene (co)polymer (A0) can be synthesized by a well-known polymerization method such as solution polymerization, bulk polymerization, suspension polymerization and emulsification polymerization, using the abovementioned monomer and the radical polymerization initiator (C).

The polymerization temperature is preferably from 60 to 240° C., more preferably from 80 to 230° C. As described infra, to render the content of ethylenic double bonds in unmodified styrene (co)polymer (A0) subjected to modification reaction to be from 0.1 to 4 mol % based on the total monomer unit of a preferred region, the polymerization temperature is particularly preferably from 150 to 230° C. (particularly from 160 to 220° C.).

The polymerization time is preferably from 1 to 30 hours, more preferably from 2 to 20 hours.

The radical polymerization initiators (C) may comprise an agent usually used in radical polymerization, and include azo-based polymerization initiators (e.g., azobisisobutyronitrile, azobisvaleronitrile, and azobiscyanovaleic acid), organoperoxides-based initiators (e.g., benzoyl peroxide, di-t-butylperoxide, and t-butylperoxybenzoate), and the like. Of these, preferred are di-t-butylperoxide, and t-butylperoxybenzoate.

The amount of use of the polymerization initiator is preferably from 0.1 to 10% based on the total amount of monomers, more preferably from 0.2 to 8%, particularly from 0.3 to 6%. Solvents (D) to be used for solution polymerization may be cycloalkane-based solvents containing 5 to 12 carbon atoms (cyclohexane, methylcyclohexane, and the like); aromatic-based solvents containing 6 to 12 carbon atoms (benzene, toluene, xylene, ethylbenzene, cumene, and the like); ester-based solvents (ethyl acetate, butyl acetate, and the like); ether-based solvents (methylcellosolve, ethylcellosolve, butylcellosolve, and the like), etc. Of these, preferred are toluene, xylene, and ethylbenzene.

The solvent (D) is removed by distillation subsequent to polymer synthesis.

In addition, suspension polymerization can be carried out in water by use of inorganic acid salt-based dispersants (calcium carbonate, calcium phosphate, and the like), organic dispersants (polyvinyl alcohol, methylcellulose, and the like), etc.

A modified styrene (co)polymer (A1) is obtainable by modifying at least a part of unmodified styrene (co)polymers (A0) by at least one monomer (a') selected from the group consisting of unsaturated dicarboxylic acids containing 4 to 30 carbon atoms, ester-forming derivatives thereof, (meth) acrylic acid, and alkyl (meth)acrylates (the carbon number of the alkyl group being from 1 to 24).

The modification in the present invention is to addition polymerize the aforementioned monomer (a') on the carbon-carbon double bond present at the polymer terminal of the styrene (co)polymer (A0). This procedure also allows unreacted styrene monomers in the styrene (co)polymer (A0) to polymerize with the monomer (a') leading to reduction of the content of styrene monomer.

The aforementioned unsaturated dicarboxylic acids and ester-forming derivatives thereof include the aforementioned monomer (a-2).

Of these, preferred are maleic acid, fumaric acid, ester-forming derivatives thereof (anhydrides and mono- and dialkyl esters having a carbon number of 1 to 4), (meth) acrylic acid, methyl (meth)acrylate, ethyl (meth)acrylate, propyl (meth)acrylate, butyl (meth)acrylate, and combinations thereof, more preferably maleic anhydride, monoalkyl maleates (the carbon number of the alkyl group being from 1 to 4), and methyl (meth)acrylate.

The use of a monomer (a') in the styrene (co)polymer (A0) as the copolymer component only does not make the stability of image quality during toner running sufficient. The modification of the styrene (co) polymer (A0) by a monomer (a') renders the running stability sufficient.

The content of ethylenic double bonds in the styrene (co) polymer (A0) subjected to modification is preferably from 0.1 to 4 mol % based on the total monomer units of the styrene (co)polymer (A0). The lower limit is more preferably 0.2 mol %; the upper limit is more preferably 3.5 mol %. When the content of ethylenic double bonds is 0.1 mol % or more, the effect of modification by a monomer (a') is sufficiently obtainable; if the content is 4 mol % or less, it is preferable from the viewpoint of electrostatic chargeability.

The content (J) of ethylenic double bonds is measured by proton NMR and is calculated by the following equation.

$$J(\%) = [(K/2) \times 100]/[(L/5) \times (M/100)]$$

K: proton strength of 2 protons in ethylenic double bonding (normally from 4.5 to 5.5 ppm)

L: proton strength of 5 protons in the benzene ring of styrene (normally from 6.0 to 7.7 ppm)

M: molar ratio (%) of the styrene in the styrene (co)polymer (A)

The amount of monomer (a') to be used for the modification of the styrene (co)polymer (A0), in terms of environmental stability and running stability, is normally from 0.1 to 9% based on the amount of modified styrene (co)polymer (A1) obtained by modification. The lower limit is preferably 0.2%; the upper limit is preferably 7%, more preferably 5%, and particularly preferably 4%.

When a monomer (a') is reacted with the styrene (co)polymer (A0), the monomer (a') only may be used, but the above-mentioned radical polymerization initiator (C) is preferably used together.

The amount of radical polymerization initiator (C) is preferably from 0 to 10% based on the weight of styrene (co)polymer (A0) subjected to modification, more preferably from 0.1 to 1%.

The reaction temperature is preferably from 100 to 230° C, more preferably from 140 to 200° C.

The reaction time is preferably from 0.01 to 20 hours, more preferably from 0.02 to 10 hours.

The reaction methods include a method of a batch type using a reaction vessel and a method of continuous reaction using an extruder.

If a reaction vessel is employed, for example, while keeping at 100 to 230° C. styrene (co)polymer (A0) dissolved in the aforementioned solvent (D), the monomer (a') and, as required, the radical polymerization initiator (C) are added dropwise over 0.001 to 10 hours and the resulting solution is reacted for 0.1 to 10 hours to yield a modified styrene (co)polymer (A1).

When an extruder is used, for example, in a state of keeping styrene (co)polymer (A0) melted at 100 to 200° C., the monomer (a') and, as required, the radical polymerization initiator (C) are fed to continuously obtain a modified styrene (co)polymer (A1).

In addition, the modification of the styrene (co)polymer (A0) by a monomer (a') can be carried out in toner production process as described infra as well.

In the first invention of the present invention, the styrene (co)polymer(s) (A) comprises a modified styrene (co)polymer (A1) and, as necessary, unmodified styrene (co)polymer (A0), and the content of the modified styrene (co)polymer (A1) in the styrene (co)polymer(s) (A) is preferably 30% or more. More preferably, the lower limit is 40%; the upper limit is 80%.

In the present invention styrene (co)polymer(s) (A) may include a (co)polymer that shows a single peak and a (co)polymer that shows a plurality of peaks, in the region of the molecular weight of 2,000 to 5,000,000, in a chromatogram of gel permeation chromatography (GPC). Of these, preferred is a (co)copolymer that exhibits a plurality of peaks in the region.

When a (co)polymer shows a single peak, the molecular weight at the peak is preferably from 8,000 to 80,000, from the viewpoint of grindability, more preferably from 10,000 to 50,000.

Where a (co)polymer shows a plurality of peaks, the (co)polymer shows preferably at least one peak each in the low molecular weight region (region of molecular weights of 2,000 to 20,000) and the high molecular weight region (region of molecular weights of 50,000 to 5,000,000), and the largest peak in each region corresponds to the largest peak and the second largest peak in the entire chromatogram.

The largest peak molecular weight in the aforementioned low molecular weight region, from the viewpoint of low temperature fixation properties and the running stability of the toner, is preferably from 2,200 to 18,000, particularly from 3,000 to 15,000.

The largest peak molecular weight in the high molecular weight region, in terms of anti-hot offset properties and pigment dispersion properties during toner making, is preferably 200,000 to 2,000,000, particularly from 400,000 to 1,500,000.

The molecular weight of styrene (co)polymer (A) in the above and below is measured by GPC in the following conditions.

Apparatus: HLC-802A manufactured by Tosoh Corp.
Column: Two of TSK gel GMH6 (manufactured by Tosoh Corp.)
Measuring temperature: 25° C.
Sample solution: 0.5% tetrahydrofuran solution
Amount of solution injection: 200 μl
Detection apparatus: refractive index detector
Standard substance: polystyrene The content of a component exhibiting a peak in the region of the low molecular weight in styrene (co) polymer(s) (A), from the viewpoint of low temperature fixation properties and the running stability of the toner, is preferably from 30 to 80%, particularly from 40 to 75%.

Preferable styrene (co)polymer(s) (A) showing at least one peak each in the low and high molecular weight regions comprises a modified styrene (co)polymer (A1) obtainable by modifying a styrene (co)polymer (A01) exhibiting the largest peak in the region of the molecular weight of 2,000 to 20,000, and/or a styrene (co)polymer (A02) exhibiting the largest peak in the region of the molecular weight of 50,000 to 5,000,000, in particular, preferably styrene (co)polymer (A01) with a monomer (a') and, as necessary, unmodified styrene (co)polymer (A01) and/or unmodified styrene (co)polymer (A02).

The following methods of (1) to (3) are exemplified as the methods to obtain styrene (co)polymer (A) which exhibits at least one peak each in the low molecular weight region (the range of the molecular weight of 2,000 to 20,000) and in the high molecular weight region (the range of the molecular weight of 50,000 to 5,000,000), wherein the largest peak in each region corresponds to the largest peak and the second largest peak in the entire chromatogram, and which comprises a modified styrene (co) polymer (A1):

(1) A method that involves blending styrene (co)polymer (A01) exhibiting the largest peak in the region of the molecular weight of 2,000 to 20,000 with styrene (co)polymer (A02) exhibiting the largest peak in the region of the molecular weight of 50,000 to 5,000,000, and then modifying them by a monomer (a');

(2) A method that involves modifying either or both of styrene (co)polymer (A01) and styrene (co)polymer (A02) with the monomer (a') and then blending them;

(3) A method that styrene (co)polymer (A02) is obtained by polymerization in the presence of a modified styrene (co)polymer (A11) exhibiting the largest peak in the region of the molecular weight of 2,000 to 20,000.

Of these methods, preferred is the method of (2), especially a method of modifying only styrene (co)polymer (A01).

The glass transition temperature (Tg) of styrene (co)polymer (A), from the viewpoint of storage stability and low temperature fixation properties, is preferably from 50 to 75° C., more preferably from 51 to 70° C., particularly from 53 to 65° C.

In addition, in the above and below, Tg is measured using DSC20, SSC/580 available from Seiko Instruments Inc. by the method (DSC method) specified in ASTM D3418-82.

The total content of monomer, dimer and trimer of styrene in the styrene (co)polymer (A), in terms of running stability, is preferably 1% by weight or less, more preferably 0.8% by weight or less. These contents can be reduced by addition polymerizing styrene (co)polymer (A0) with a monomer (a') as described above, and there includes a method further reducing them that, for instance, involves rendering styrene (co)polymer (A) produced in advance by adjusting the content of solvent and monomers to 3% by weight or less, at a temperature of 150 to 190° C., pushing-in water or water vapor so that the pressure is from 0.1 to 0.3 MPa, and subsequently the operation that causes the pressure to be 2.5 kPa or less is repeated from 2 to 10 times.

Also, the contents of monomer, dimer and trimer of styrene are determined by the methods below.

(1) Method of Measuring the Content of Styrene Monomer
Apparatus: GC-14A available from Shimadzu Corp.
Column: PEG20M20% Chromosorb W Applied 2 m Glass column
Internal standard: amyl alcohol
Detector: FID detector
Column temperature: 100° C.
Sample concentration: 5% DMF solution
Determination method: The calibration curves of styrene and amyl alcohol are constructed in advance, and then the content of styrene monomer in the sample is determined on the basis of these calibration curves.

(2) Method of Measuring the Contents of Styrene Dimer and Styrene Trimer
Apparatus: GC/MS (Gas chromatography/Mass spectrum)
GC; GC-17A (capillary GC) available from Shimadzu Corp.
MS; QP 5000 available from Shimadzu Corp.
Column: DB-5 30 m, 0.25 mm$\phi$
Column temperature: 50 to 300° C. (rate of temperature rise 10° C./min)
INJ temperature: 210° C.
DET temperature: 300° C.
Linear velocity: 25 cm/sec
Split ratio: 50
Injection amount: 0.1 $\mu$l
Sample solution: To 1 g of a sample is added 2 ml of 500 ppm naphthalene in acetone solution to the total amount of 20 ml.
Identification: Peaks corresponding to 1 and m below, and not corresponding to n are regarded as dimer and trimer.
l; The molecular ions [M+1] (dimer=209, trimer=313) are recognized by GC/MS (CI mode).
m; Fragment ions (91, 104, 105, 207, etc.) and molecular ions [M+] (dimer=208, trimer=312) are recognized by GC/MS (EI mode).
n; Clearly other compound
Determination method: In GC analysis, from the areas of the aforementioned peaks corresponding to the dimer and trimer and the area of the naphthalene, the contents of styrene dimer and trimer in the sample is determined by ratio calculation. (Calculation is performed by assuming that the gas chromatography peak strength to the concentration of naphthalene is the same as the gas chromatography peak strength to the concentration of the styrene dimer and the styrene trimer.)

In the first present invention, at least a part of styrene (co)polymer(s) (A) needs to be a modified styrene (co)polymer (A1), and if styrene (co)polymer(s) (A) in a chromatogram of GPC exhibits at least one peak each in the region of the molecular weight of 2,000 to 20,000 and in the region of the molecular weight of 50,000 to 5,000,000, exhibits the relationship of the largest peak in each region corresponding to the largest peak and the second largest peak in the entire chromatogram, and has the total content of monomer, dimer and trimer of the styrene being 1% by weight or less, then the styrene (co)polymer preferably contains a modified styrene (co)polymer (A1). However, a (co)polymer only consisting of styrene (co)polymer (A0) provides a good running stability. (the second present invention)

To toner binder of the present invention, a releasing agent and other resin can be added to further improve low temperature fixation properties and anti-offset properties.

The releasing agents include, for example, polyolefin wax, natural wax, aliphatic alcohols containing 30 to 50 carbon atoms, aliphatic acids containing 30 to 50 carbon atoms, mixtures thereof, and the like.

The polyolefin waxes include, for example, a (co) polymer (E-1) of an olefin, an oxide (E-2) of a (co)polymer of an olefin, a maleic modified substance (E-3) of a (co) polymer of an olefin, a copolymer (E-4) of an olefin and an unsaturated carboxylic acid, SasolWax (trademark), and the like. The (co)polymers (E-1) of olefins include, for example, (co)polymers of ethylene, propylene, 1-butene, isobutylene, 1-hexene, 1-dodecene, 1-octadecene, mixtures thereof (e.g., polyethylene, polypropylene, ethylene/propylene copolymer, ethylene/1-butene copolymer and propylene/1-hexene copolymer) and the like.

The (co)polymerization can be carried out using a well-known catalyst by a well-known method or the like. The (co)polymers (E-1) of olefins include a substance (E-1-1) obtained from (co)polymerization of an olefin, and a thermal degradation type polyolefin (E-1-2).

The thermal degradation type polyolefins (E-1-2) include, for example, a polyolefin obtained by thermally degrading a polyolefin resin having a weight average molecular weight (Mw) of 50,000 to 5,000,000 (e.g., polyethylene and polypropylene). Thermal degradation is normally performed at from 270 to 450° C.

Additionally, in the above and below, the Mw and the number average molecular weight (Mn) of polyolefin wax and a raw material thereof can be determined by means of GPC (solvents: orthodichlorobenzene, standard substance: polystyrene).

The oxides (E-2) of (co)polymers of olefins include oxides of (co)polymers (E-1) of the aforementioned olefins.

The oxidation can be carried out using oxygen and/or ozone or the like by a well-known method, for example, by the method described in U.S. Pat. No. 3,692,877.

The maleic modified substances (E-3) include, for example, a maleic acid-based monomer [e.g., maleic acid and derivatives thereof (maleic anhydride, monomethyl maleate, monobutyl maleate, dimethyl maleate, and the like)] modified substances of aforementioned (co)polymers (E-1) of the olefins.

The modification can be carried out by a well-known method, for example, by reacting a (co)polymer (E-1) of olefins with a maleic acid-based monomer using a well-known peroxide catalyst by means of the solution method or the melt method.

The copolymers (E-4) include, for example, copolymers of the aforementioned olefins and unsaturated carboxylic acids [(meth) acrylic acid, itaconic acid, maleic anhydride, and the like] and/or alkyl unsaturated carboxylates [alkyl (meth)acrylate (alkyl having a carbon number of 1 to 18) and alkyl maleates (alkyl having a carbon number of 1 to 18), and the like], etc.

The copolymerization can be conducted using a well-known catalyst by a well-known method or the like.

The Mw of a polyolefin wax, from the standpoint of filming onto a carrier and the like and release characteristics, is preferably from 1,000 to 30,000, more preferably from 1500 to 25000, particularly from 2,000 to 20,000.

The melting point of a polyolefin wax, from the standpoint of filming onto a carrier and the like and release characteristics, is preferably from 50 to 160° C., more preferably from 60 to 155° C., particularly from 65 to 150° C.

The natural waxes include, for example, carnauba wax, montan wax, paraffin wax and rice wax.

The aliphatic alcohols containing 30 to 50 carbon atoms include, for example, triacontanol.

The aliphatic acids containing 30 to 50 carbon atoms include, for example, triacontan carboxylic acid.

Of these, preferred are polyolefin wax, natural wax, and mixtures thereof, more preferably thermal degradation type polyolefins, particularly preferably a thermal degradation type polyethylene and a thermal degradation type polypropylene.

When a releasing agent is used, in order to finely disperse the releasing agent, it is preferable that styrene (co)polymer is obtained by polymerization in the presence of the releasing agent, and then is modified by a monomer (a').

The other resins include, for example, a polyester resin, a polyamide resin, and the like.

The polyester resins include, for example, polycondensate of a polyol and a polycarboxylic acid, and the like.

The polyols include, for example, a diol (g) and a polyol (h) with the functionality of 3 to 8 or more, and the polycarboxylic acids include, for example, a dicarboxylic acid (i) and a polycarboxylic acid (j) having the functionality of 3 to 6 or more.

The diols (g) include, for example, a diol having a hydroxyl value of from 180 to 1900 mg KOH/g, more specifically, alkylene glycols containing 2 to 36 carbon atoms (ethylene glycol, 1,2-propylene glycol, 1,4-butanediol, and the like); alkylene ether glycols containing 4 to 36 carbon atoms (diethylene glycol, dipropylene glycol, polyethylene glycol, polypropylene glycol, and the like); alicyclicdiols containing 6 to 36 carbon atoms (1,4-cyclohexane dimethanol, a hydrogenated bisphenol A, and the like); bisphenols (bisphenol A, bisphenol F, and the like); AO [ethylene oxide (EO), propylene oxide (PO), butylene oxide (BO), and the like] adducts (addition mole number of 2 to 30) of the aforementioned alicyclic diols and bisphenols, etc.

In the above and below, AO means an alkylene oxide containing 2 to 4 carbon atoms.

Of these, preferred are an alkylene glycol containing 2 to 12 carbon atoms, AO adducts (addition mole number of 2 to 30) of bisphenols, and combinations thereof.

The polyols (h) having the functionality of 3 to 8 or more include, for example, a polyol having a hydroxyl value of 150 to 1900 mg KOH/g, more specifically, aliphatic polyalcohols having the functionality of 3 to 8 or more (glycerin, trimethylolpropane, pentaerythritol, sorbitol, and the like); AO (EO, PO, BO, and the like) adducts (addition mole number of 2 to 30) of the aforementioned aliphatic polyalcohols; trisphenols (trisphenol PA, and the like); novolac resins (phenol novolac, and the like); AO adducts (addition mole number of 2 to 30) of the aforementioned trisphenols; AO adducts (addition mole number of 2 to 30) of the aforementioned novolac resin, and the like.

Of these, preferred are aliphatic polyalcohols having the functionality of 3 to 8 or more and AO adducts (addition mole number of 2 to 30) of novolac resin.

The dicarboxylic acids (i) include, for example, a dicarboxylic acid having an acid value of 180 to 1250 mg KOH/g, more specifically, alkylenedicarboxylic acids containing 4 to 36 carbon atoms (succinic acid, adipic acid, sebacic acid, and the like); alkenylenedicarboxylic acids containing 4 to 36 carbon atoms (maleic acid, fumaric acid, and the like); aromatic dicarboxylic acids containing 8 to 36 carbon atoms (phthalic acid, terephthalic acid, and the like), etc. Of these, preferred are alkenylenedicarboxylic acids containing 4 to 20 carbon atoms and aromatic dicarboxylic acids containing 8 to 20 carbon atoms.

The polycarboxylic acids (j) having the functionality of 3 to 6 or more include, for example, a polycarboxylic acid having an acid value of 150 to 1250 mg KOH/g, more specifically, aromatic polycarboxylic acids containing 9 to 20 carbon atoms (trimellitic acid, piromellitic acid, and the like), vinyl polymers of unsaturated carboxylic acids [styrene/maleic acid copolymer, styrene/acrylic acid copolymer, and the like], etc. Of these, preferred are aromatic polycarboxylic acids containing 9 to 20 carbon atoms.

In addition, dicarboxylic acids (i) or polycarboxylic acids (j) for the use include acid anhydrides and lower alkyl (carbon number of 1 to 4) esters (methyl esters, ethyl esters, and the like) of the above.

The largest peak molecular weight of polyester resin is preferably from 1,000 to 30,000, and the Tg is preferably from 40 to 90° C.

The polyester resin can be obtained by dehydration condensation of a polyol and polycarboxylic acid in the presence of a well-known esterification catalyst. To improve the reaction rate of final reaction, it is also effective to reduce the pressure.

The polyester resins can also be used in a combination of two species or more.

The polyamide resins include, for example, (1) ring opening polymers of lactam, (2) polycondensates of aminocarboxylic acids, (3) polycondensates of the aforementioned dicarboxylic acids (i) and/or polycarboxylic acids (j) having the functionality of 3 to 6 or more, with polyamines, and the like.

The ring opening polymerization and the polycondensation reaction can be carried out using a well-known catalyst or the like by the usual method.

The lactams include, for example, a lactam containing 6 to 12 carbon atoms, e.g., caprolactam, and enantlactam.

The aminocarboxylic acids include, for example, aminocarboxylic acids containing 2 to 12 carbon atoms, e.g., amino acids (glycine, alanine, etc.), and ω-aminocaproic acid.

The polyamines include, for example, aliphatic polyamines containing 2 to 18 carbon atoms, aromatic polyamines containing 6 to 20 carbon atoms, and the like.

The aliphatic polyamines containing 2 to 18 carbon atoms for the use include, for example, (1) aliphatic polyamines, (2) alkyl (carbon number of 1 to 4) substitution products thereof, (3) alicyclic polyamines, (4) aromatic ring-bearing aliphatic amines (carbon number of 8 to 15), and the like.

(1) The aliphatic polyamines include, for example, alkylenediamines containing 2 to 12 carbon atoms (ethylenediamine, propylenediamine, and the like), polyalkylene (carbon number of 2 to 6)polyamines (diethylenetriamine, triethylenetetramine, and the like), etc.

(2) The alkyl (carbon number of 1 to 4) substitution products thereof include, for example, dialkyl(carbon number of 1 to 3)aminopropylamines, trimethylhexamethylenediamine, and the like.

(3) The alicyclic polyamines include, for example, alicyclic polyamines containing 4 to 15 carbon atoms (1,3-diaminocyclohexane, isophoronediamine, and the like), etc.

(4) The aromatic ring-bearing aliphatic amines (carbon number of 8 to 15) include, for example, xylylenediamine, and the like.

The aromatic polyamines containing 6 to 20 carbon atoms include, for example, (1) unsubstituted aromatic polyamines, (2) aromatic polyamines having a nuclear substituted alkyl group (carbon number of 1 to 4), and the like.

(1) The unsubstituted aromatic polyamines include, for example, 1,2-, 1,3-, or 1,4-phenylenediamine, 2,4'- or 4,4'-diphenylmethanediamine, and the like.

(2) The aromatic polyamines having a nuclear substituted alkyl group include, for example, 2,4-or 2,6-tolylenediamine, 4,4'-diamino-3,3'-dimethyldiphenylmethane, and the like.

The largest peak molecular weight of a polyamide resin is preferably from 1,000 to 30,000, and the Tg is preferably from 40 to 90° C.

The contents of styrene (co)polymer (A), releasing agent and other resins in the toner binder are preferably, respectively, from 70 to 100%, from 0 to 10%, and from 0 to 20%, more preferably, respectively, from 77 to 100%, from 0 to 8%, and from 0 to 15%, particularly from 84 to 100%, from 0 to 6% and from 0 to 10%.

To obtain a toner binder containing a releasing agent and/or other resins, styrene (co)polymer (A) and a releasing agent and/or other resins may be powder blended, or may be melt blended or solution mixed by means of a twin-screw extruder, a blending vessel capable of heat agitation, or the like, and styrene (co)polymer (A) may also be produced in the presence of a releasing agent and/or other resins.

A toner of the present invention comprises a toner binder of the present invention and a colorant and, as required, a variety of additives such as a releasing agent, a charge controlling agent and a flowability providing agent can be mixed therewith.

As the colorant, a well-known pigment, a dye and a magnetic powder can be used. More specifically, the colorants include, for example, carbon black, Sudan Black SM, Fast Yellow G, Benzidine Yellow, Pigment Yellow, Indofast Orange, Irgasin Red, Paranitroaniline Red, Toluidine Red, carmine FB, Pigment Orange R, Lake Red 2G, Rhodamine FB, Rhodamine B Lake, Methyl Violet B Lake, Phthalocyanine Blue, Pigment Blue, Brilliant Green, Phthalocyanine Green, Oil Yellow GG, Kayaset YG, Orasol Brown B, Oil Pink OP, magnetic powers [e.g., powers of ferromagnetic metals (iron, cobalt, nickel, and the like), magnetite, hematite, and ferrite], and the like.

The content of colorant in the toner, when a dye or a pigment is used, is preferably from 1 to 15%, more preferably from 2 to 10%, when a magnetic powder is used, is preferably from 15 to 70%, more preferably from 30 to 60%.

The releasing agents include agents similar to the releasing agent as described supra.

The amount of releasing agent in the toner is preferably from 0 to 10%, more preferably from 1 to 8%.

The charge controlling agents include, for example, azo dyes containing a metal, nigrosine dyes, and quaternary ammonium salt compounds.

The content of charge controlling agent in the toner is preferably from 0 to 5%, more preferably from 1 to 5%.

The flowability providing agents include, for example, well-known substances such as colloidal silica, alumina powders, titanium oxide powders, calcium carbonate powders, and the like.

The content of flowability providing agent in the toner is preferably from 0 to 5%.

The methods for producing a toner include the well-known kneading pulverizing method or the like, which involves, for example, dry blending the aforementioned toner constituents by means of a Henschel mixer or the like, melt kneading the resultant material with a twin-screw extruder or the like at 70° C. to 190° C., pulverizing the resulting material, finally pulverizing the material with a jet pulverizer or the like, and further classifying. The average particle diameter (D 50) of the fine particle thus obtained is preferably from 5 to 20 microns.

In addition, D50 is determined using Coulter counter [for example, trade name: Multisizer III (product of Coulter Corp.)].

Also, in the above-described method, a flowability providing agent can also be blended (added from the outside) for use after pulverizing the toner.

The methods of modifying styrene (co)polymer (A0) during toner production as discussed supra include a method, for example in the aforementioned method of producing a toner, that involves dry blending styrene (co)polymer (A0) and other toner constituents with a Henschel mixer or the like, and then feeding a monomer (a') and, as required, a radical polymerization initiator (C) for modification in melt kneading by means of a twin-screw extruder or the like.

The toner, as appropriate, is used as a developer by mixing the toner with a carrier particle such as glass beads and/or a ferrite, the surface of which is coated with a resin (acryl resin, silicone resin, or the like). Additionally, the toner can also be made charged by rubbing the toner against a member such as a charged blade or the like in place of a carrier particle. Then, the toner is moved to an electrostatic latent image on a photoreceptor body, and further transported onto a support (paper, polyester film, or the like).

Furthermore, the toner is made a recording material by fixing it on the support by mean of the well-known heated roll fixing method or the like.

EXAMPLES

Hereinafter, the present invention will be further set forth by means of examples; however, the invention is by no means limited thereto. Hereinafter, parts are by parts by weight.

The test methods for a toner are in the following.

(1) Lowest Fixing Temperature

30 Parts of a toner and 800 parts of a ferrite carrier (F-150, product of Powdertech Co., Ltd.) were homogeneously blended to yield a two-component developer, which is subjected to testing.

An unfixed image developed with a commercially available monochrome copying machine [AR5030, product of Sharp Corp.] is fixed at a process speed of 145 mm/sec using a fixing machine that is produced by converting the fixing unit of a commercially available monochrome copying machine [SF8400A, product of Sharp Corp.], the heat roller temperature of which is changeable. An image having an image density (I.D.) of 0.6 is rubbed reciprocatically 5 times with a friction fastness test of a mode of Japan Society for the Promotion of Science (rubbed by paper), and the heated roller temperature of a fixing degree (I. D. after friction×100/I.D. before friction) becoming 70% or more is defined as the lowest fixing temperature.

(2) Hot Offset Generating Temperature

An unfixed image is fixed as in the above (1), and the presence or absence of hot offset to the fixed image is visually evaluated. The temperature of initiating the generation of hot offset is defined as the hot offset generating temperature.

(3) Running Stability

With a two-component developer produced as in (1) supra, continuous copying was carried out by means of a commercially available monochrome copying machine [AR5030, product of Sharp Corp.] to evaluate the image quality change on the basis of the following criteria.

○: Image quality is not changed and no fogging is generated after 10,000 copies.

Δ: Fogging is generated after 10,000 copies.

x: Fogging is generated even after 1,000 copies.

(4) Storage Stability

A toner was allowed to stand in a water thermostat at 50° C. for 8 hours, and then the resultant toner is subjected to constant vibration for 10 seconds on a sieve having 43 meshes to evaluate based on the amount of toner remaining on the sieve.

○: The amount of toner remaining on the sieve is less than 10%.

Δ: The amount of toner remaining on the sieve is not less than 10% and less than 20%.

x: The amount of toner remaining on the sieve is 20% or more.

Synthesis Example 1

In an autoclave was placed 180 parts of xylene, and the air inside was replaced by nitrogen, and then the temperature was increased to 200° C. with agitation under sealed conditions. A mixture solution of 500 parts of styrene, 7 parts of di-t-butylperoxide and 100 parts of xylene was added dropwise for 3 hours for polymerization while controlling the temperature inside the autoclave to 200° C. Further, at the temperature the material was kept for 1 hour to complete the polymerization, and subsequently cooled to 140° C. 10 Parts of maleic anhydride was fed therein and the air inside was replaced by nitrogen, and then the temperature was increased to 160° C. with agitation. A mixture solution of 0.5 part of di-t-butylperoxide and 5 parts of xylene was fed therein and the temperature was maintained for 2 hours to complete the reaction, thereby obtaining the resin solution (G-1). The content of double bonds prior to maleic anhydride modification of the polymer portions of the resin solution (G-1) was 2.1 (mol % per monomer), and the peak molecular weight was 4600.

Synthesis Example 2

In an autoclave was placed 180 parts of xylene, and the air inside was replaced by nitrogen, and then the temperature was increased to 180° C. with agitation under sealed conditions. A mixture solution of 485 parts of styrene, 15 parts of n-butylacrylate, 15 parts of di-t-butylperoxide and 100 parts of xylene was added dropwise for 3 hours for polymerization while controlling the temperature inside the autoclave to 180° C. Further, at the temperature the material was kept for 1 hour to complete the polymerization, and subsequently cooled to 140° C. 10 Parts of methyl methacrylate was fed therein and the air inside was replaced by nitrogen, and then the temperature was increased to 160° C. with agitation. A mixture solution of 0.5 part of di-t-butylperoxide and 5 parts of xylene was fed therein and the temperature was maintained for 2 hours to complete the reaction, thereby obtaining the resin solution (G-2). The content of double bonds prior to methyl methacrylate modification of the polymer portions of the resin solution (G-2) was 1.0 (mol % per monomer), and the peak molecular weight was 4800.

Synthesis Example 3

In an autoclave was placed 180 parts of xylene, and the air inside was replaced by nitrogen, and then the temperature was increased to 210° C. with agitation under sealed conditions. A mixture solution of 500 parts of styrene, 15 parts of di-t-butylperoxide and 100 parts of xylene was added dropwise for 3 hours for polymerization while controlling the temperature inside the autoclave to 200° C. Further, at the temperature the material was kept for 1 hour to complete the polymerization, thereby obtaining the resin solution (G-3). The content of double bonds of the polymer portions of the resin solution (G-3) was 3.0 (mol % per monomer), and the peak molecular weight was 2200.

Synthesis Example 4

The autoclave was replaced by nitrogen in place of air inside, and then 375 parts of styrene, 125 parts of n-butylmethacrylate, 0.3 part of divinylbenzene and 3 parts of 1,1-di-t-butylperoxy-3,3,5-trimethylcyclohexane were fed therein. While taking care of heat generation, the resulting material was slowly raised to 95° C., and bulk polymerized at the temperature for 2 hours. Thereafter, while dropping 150 parts of xylene therein for 4 hours the temperature was increased to 110° C. and at the temperature polymerization was carried out for 2 hours. Then, while dropping therein a mixture solution of 250 parts of xylene and 3 parts of 1,1-di-t-butylperoxy-3,3,5-trimethylcyclohexane for 4 hours, the temperature was increased to 150° C. At the temperature polymerization was conducted for 1 hour, and then the resultant material was diluted with 300 parts of xylene to yield the resin solution (G-4). The peak molecular weight was 500,000.

Synthesis Example 5

The resin solution (G-5) was obtained as in Synthesis Example 4 with the exception that 100 parts of n-butylacrylate was used instead of 125 parts of n-butylmethacrylate and that 25 parts of 2-hydroxyethylmethacrylate was fed as a monomer therein. The peak molecular weight was 520,000.

Synthesis Example 6

The resin solution (G-6) was obtained as in Synthesis Example 4 with the exception that, at the time of monomer feeding, 25 parts of polyethylene having the peak of heat of melting at 120° C. and 25 parts of polypropylene having the peak of heat of melting at 145° C. were fed with the peak of heat of melting measured by DSC. The peak molecular weight was 500,000.

Synthesis Example 7

In an autoclave were fed 468 parts of the resin solution (G-3) and 482 parts of resin solution (G-4) and the temperature was increased to 140° C. with agitation. 10 Parts of maleic anhydride was introduced therein and the air inside was replaced by nitrogen and then the temperature of the resultant material was increased to 160° C. with agitation. Therein was fed a mixture solution of 0.5 part of di-t-butylperoxide and 5 parts of xylene and the temperature was kept for 2 hours to complete the reaction. While removing the xylene by distillation, the temperature was raised to 180° C. and then the pressure was reduced to a pressure of 1 kPa and kept for 60 minutes to thereby obtain the toner binder (H-1).

Synthesis Example 8

In an autoclave were fed 468 parts of the resin solution (G-1) and 482 parts of resin solution (G-4) and the temperature was increased to 180° C. with agitation while removing the xylene by distillation. At the temperature the pressure was reduced to a pressure of 1 kPa and kept for 60 minutes to thereby obtain the toner binder (H-2).

Synthesis Example 9

The toner binder (H-3) was obtained as in Synthesis Example 8 with the exception that the resin solution (G-5) in place of the resin solution (G-4) was used.

Synthesis Example 10

The toner binder (H-4) was obtained as in Synthesis Example 8 with the exception that the resin solution (G-6) in place of the resin solution (G-4) was used.

Synthesis Example 11

The toner binder (H-5) was obtained as in Synthesis Example 8 with the exception that the resin solution (G-2) in place of the resin solution (G-1) was used.

Synthesis Example 12

In an autoclave was fed 390 parts of the resin solution (G-1) and the temperature was increased to 170° C. and then the pressure was reduced to remove the xylene by distillation. After cooled to 120° C., therein were fed further 183 parts of styrene, 67 parts of butyl acrylate, 0.1 part of 1, 6-hexanediol diacrylate and 1 part of 1,1-di-t-butylperoxy-3,3,5-trimethylcyclohexane, and while taking care of heat generation, the resulting material was slowly raised to 95° C., and polymerized at the temperature for 4 hours. Thereafter, the temperature was increased to 110° C. spending 1 hour and at the temperature, polymerization was carried out for 3 hours, and then the temperature was increased to 150° C. spending 2 hours and at the temperature, polymerization was carried out for 2 hours, and further the temperature was increased to 180° C. spending 2 hours and at the temperature, polymerization was carried out for 3 hours to complete polymerization. Subsequently, the pressure was set to 1 kPa and kept for 90 minutes to yield the toner binder (H-6).

Comparative Synthesis Example 1

The toner binder (R-1) was obtained as in Synthesis Example 8 with the exception that the resin solution (G-3) in place of the resin solution (G-1) was used.

Comparative Synthesis Example 2

The toner binder (R-2) was obtained as in Synthesis Example 12 with the exception that the resin solution (G-3) in place of the resin solution (G-1) was used.

The measurement results of the peak molecular weights (molecular weights of the largest peak and the second largest peak) of the toner binders (H-1) to (H-6) and the toner binders (R-1) and (R-2), the values of Tg, and the total contents of styrene, styrene dimer and styrene trimer are shown in Table 1.

TABLE 1

| Toner binder No. | Peak molecular weight of low molecular weight region ($\times 10^3$) | Peak molecular weight of high molecular weight region ($\times 10^3$) | Glass transition temperature (Tg) (° C.) | Content of styrene, styrene dimer, and styrene trimer (%) |
|---|---|---|---|---|
| H-1 | 2.2 | 505 | 57 | 1.0 |
| H-2 | 4.6 | 510 | 58 | 0.6 |
| H-3 | 4.6 | 520 | 60 | 0.5 |
| H-4 | 4.6 | 500 | 60 | 0.7 |
| H-5 | 4.8 | 510 | 58 | 0.6 |
| H-6 | 4.8 | 450 | 60 | 0.9 |
| R-1 | 2.2 | 500 | 55 | 2.0 |
| R-2 | 4.9 | 380 | 58 | 1.9 |

Preparation of Toners

With 88 parts of each of (H-1) to (H-6) and (R-1) and (R-2) were homogeneously blended 7 parts of carbon black [product of Mitsubishi Kasei Co., Ltd. MA100], 3 parts of low molecular weight polypropylene [Biscol 550P, product of Sanyo Chemical Industries, Ltd.] and 2 parts of a charge controlling agent (Spiron Black TRH, product of Hodogaya Chemical Co., Ltd.), and then the resultant material was kneaded at a resin temperature of 130° C. by means of a twin-screw extruder. The resulting cooled material was pulverized with a jet pulverizer and classified with dispersion separator to obtain the toners (T-1) to (T-8) having an average particle diameter of 9 μm.

Testing Example

With 3 parts of each of the toners (T-1) to (T-8) was homogeneously blended 97 parts of a ferrite carrier [EFV200/300, product of Nippon Flour Mills Co., Ltd.], and the resulting materials were determined for the lowest fixing temperatures and the hot offset generating temperatures and evaluated for running stabilities and storage stabilities. The results are shown in Table 2.

As indicated in Table 2, the toners (T-1) to (T-6) according to the binders (H-1) to (H-6) of the present invention all have excellent low temperature fixing properties and hot offset resistance properties, and also exhibit excellent running stabilities and storage stabilities. On the other hand, the toners (T-7) and (T-8) according to the binders (R-1) and (R-2) of Comparative Examples are inferior in running properties such as causing fogging on the images and insufficient in storage stabilities, leading to the generation of blocking for storage at 50° C. In this manner, the use of a toner binder of the present invention can obtain a toner having no problems particularly with image quality degradation during toner running, storage stability, etc.

TABLE 2

| Toner No. | Lowest fixing temperature (° C.) | Hot offset generating temperature (° C.) | Running stability | Storage stability |
|---|---|---|---|---|
| T-1 | 130 | 235 | ○ | ○ |
| T-2 | 140 | 235 | ○ | ○ |
| T-3 | 140 | 240 | ○ | ○ |
| T-4 | 135 | 240 | ○ | ○ |
| T-5 | 140 | 235 | ○ | ○ |
| T-6 | 140 | 230 | ○ | ○ |
| T-7 | 145 | 230 | X | X |
| T-8 | 150 | 200 | X | Δ |

As discussed supra, a toner binder of the present invention allows low temperature fixing properties and anti-hot offset properties important as performance of a toner to be high level, and enables a toner without troubles such as fusing generation and image quality degradation during running and excellent in storage stability to be obtained, and thus is extremely useful.

The invention claimed is:

1. A toner binder for electrophotography comprising styrene (co)polymer(s) which, in a chromatogram of gel permeation chromatography, exhibits at least one peak each in the region of the molecular weight of 2,200 to 4,800 and in the region of the molecular weight of 50,000 to 5,000,000, with the largest peak in each region corresponding to the largest peak and the second largest peak in the entire chromatogram, and which has the content of styrene therein as the constituent unit of 50% by weight or more, wherein the total content of monomer, dimer and trimer of styrene therein is 1% by weight or less.

2. A toner binder for electrophotography comprising styrene (co)polymer(s) (A), at least a part of said styrene (co)polymer(s) (A) being a modified styrene (co)polymer (A1) below:

said modified styrene (co)polymer (A1): a polymer obtained by modifying a styrene (co)polymer (AO) exclusively with at least one monomer (a') selected from the group consisting of unsaturated dicarboxylic acids containing 4 to 30 carbon atoms, ester-forming derivatives thereof, (meth)acrylic acid, and alkyl (meth)acrylates (a carbon number of alkyl group of 1 to 24); said modified (co)polymer containing constituent units derived from the monomer (a') used in the modification in an amount of 0.1 to 9% by weight, wherein the styrene (co)polymer(s) (A) of the toner binder, in a chromatogram of gel permeation chromatography, exhibits at least one peak each in the region of the molecular weight of 2,000 to 20,000 and in the region of the molecular weight of 50,000 to 5,000,000, with the largest peak in each region corresponding to the largest peak and the second largest peak in the entire chromatogram, and comprises the modified styrene (co)polymer (AI) obtained by modifying a styrene (co)polymer (A01) exhibiting the largest peak in the region of the molecular weight of 2,000 to 20,000 and optionally a styrene (co)polymer (A02) exhibiting the largest peak in the region of the molecular weight of 50,000 to 5,000,000 with said at least one monomer (a'). and, as required, said unmodified styrene (co)polymer (A01) and/or said unmodified styrene (co)polymer (A02).

3. The toner binder for electrophotography according to claim 2, wherein the content of ethylenic double bonds of the styrene (co)polymer subjected to modification is from 0.1 to 4 mol % based on the total monomer units of said styrene (co)polymer.

4. A toner comprising a colorant and the toner binder for electrophotography of claim 2.

5. The toner binder for electrophotography according to claim 1, wherein the styrene (co)polymer(s) of the toner binder, in a chromatogram of gel permeation chromatography, exhibits at least one peak each in the region of the molecular weight of 2,200 to 4,800 and in the region of the molecular weight of 50,000 to 5,000,000, with the largest peak in each region corresponding to the largest peak and the second largest peak in the entire chromatogram, and comprises the modified styrene (co)polymer (A1) obtained by modifying a styrene (co)polymer (A01) exhibiting the largest peak in the region of the molecular weight of 2,200 to 4,800 and optionally a styrene (co)polymer (A02) exhibiting the largest peak in the region of the molecular weight of 50,000 to 5,000,000 with at least one monomer (a') selected from the group consisting of unsaturated dicarboxylic acids containing 4 to 30 carbon atoms, ester-forming derivatives thereof, (meth)acrylic acid, and alkyl (meth)acrylates (a carbon number of alkyl group of 1 to 24), and, as required, said unmodified styrene (co)polymer (A01) and/or said unmodified styrene (co)polymer (A02); the modified styrene (co) polymer (A1) containing constituent units derived from the monomer (a') used for modification in an amount of 0.1 to 9% by weight.

6. A toner comprising a colorant and the toner binder for electrophotography of claim 1.

7. The toner binder for electrophotography according to claim 5, wherein the content of ethylenic double bonds of the styrene (co)polymer subjected to modification is from 0.1 to 4 mol % based on the total monomer units of said styrene (co)polymer.

8. A toner comprising a colorant and the toner binder for electrophotography of claim 5.

* * * * *

UNITED STATES PATENT AND TRADEMARK OFFICE
CERTIFICATE OF CORRECTION

PATENT NO. : 7,649,053 B2 Page 1 of 1
APPLICATION NO. : 10/505918
DATED : January 19, 2010
INVENTOR(S) : Tomohisa Kato It is certified that error appears in the above-identified patent and that said Letters Patent is hereby corrected as shown below:

On the Title Page, Item (74), "*Attorney, Agent, or Firm*—Edwards Angell Palmer & Dodge LLP; Jun Umemuro; Dwight D. Kim" should be replaced with --*Attorney, Agent, or Firm*—Edwards Angell Palmer & Dodge LLP; Dwight D. Kim--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,649,053 B2 |
| APPLICATION NO. | : 10/505918 |
| DATED | : January 19, 2010 |
| INVENTOR(S) | : Tomohisa Kato |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Twenty-third Day of November, 2010

David J. Kappos
*Director of the United States Patent and Trademark Office*